US006988203B2

(12) United States Patent
Davis et al.

(10) Patent No.: US 6,988,203 B2
(45) Date of Patent: Jan. 17, 2006

(54) SYSTEM AND METHOD OF EXTENDING COMMUNICATIONS WITH THE WIEGAND PROTOCOL

(75) Inventors: Michael Davis, Amherst, NY (US); Tam Hulusi, Northport, NY (US)

(73) Assignee: Honeywell International Inc., Morristown, NJ (US)

( * ) Notice: Subject to any disclaimer, the term of this patent is extended or adjusted under 35 U.S.C. 154(b) by 835 days.

(21) Appl. No.: 09/828,395

(22) Filed: Apr. 6, 2001

(65) Prior Publication Data

US 2002/0174357 A1 Nov. 21, 2002

(51) Int. Cl.
*H04L 9/32* (2006.01)

(52) U.S. Cl. ....................................... 713/185; 714/758

(58) Field of Classification Search ................ 713/200, 713/185–186, 182; 235/382; 714/758
See application file for complete search history.

(56) References Cited

U.S. PATENT DOCUMENTS 4,163,215 A 7/1979 Iida
4,849,927 A * 7/1989 Vos ......................... 235/382.5
5,028,918 A 7/1991 Giles et al.
5,166,676 A 11/1992 Milheiser
5,235,642 A * 8/1993 Wobber et al. ............. 713/156
5,467,082 A * 11/1995 Sanderson ................. 340/5.61
5,491,471 A 2/1996 Stobbe
5,517,172 A 5/1996 Chiu
5,521,602 A 5/1996 Carroll et al.
5,679,945 A * 10/1997 Renner et al. .............. 235/492
5,848,541 A 12/1998 Glick et al.
5,886,894 A * 3/1999 Rakoff ........................... 700/3
5,923,264 A 7/1999 Lavelle et al.
5,954,583 A * 9/1999 Green ......................... 463/29
6,249,212 B1 * 6/2001 Beigel et al. ............ 340/10.34
6,272,562 B1 * 8/2001 Scott et al. .................... 710/16
6,411,199 B1 6/2002 Geiszler et al.
6,496,595 B1 * 12/2002 Puchek et al. .............. 382/124

OTHER PUBLICATIONS

IB Technology, "Micro RWD H4001 'Wiegand' Output Version", Jul. 3, 2000, 6 pages.*
Hughes Identification Devices, Cable Installation Instructions for MiniProx Reader-Model #5363 Wiegand, 12 Volt with 18", 2 pages.
Security Industry Association, "Access Control Standard Protocol for the 26-Bit Wiegand Reader Interface," Oct. 17, 1996, 15 pages.
HID Corporation, "Installation Manual—5365-902 Rev D, MiniProx Readers—Wiegand 5365B and Clock and Data 5368B," 7 pages.
HID Corporation, "Support, Application Notes", Apr. 6, 2000, http://www.hidcorp.com/support/appnotes.html, 30 pages.

* cited by examiner

*Primary Examiner*—Andrew Caldwell
*Assistant Examiner*—Jeffrey Popham
(74) *Attorney, Agent, or Firm*—Anthony R. Barkume, P.C.

(57) ABSTRACT

An extension of the industry standard Wiegand protocol for enabling two way extended communication, enhanced error detection, encryption, multiple reader capability, and enhanced information regarding the embedded data stream between a Wiegand device such as a card reader and a control panel on the existing 5-wire bus structure without requiring the modification to the existing infrastructure.

22 Claims, 3 Drawing Sheets

SYSTEM AND METHOD OF EXTENDING COMMUNICATIONS WITH THE WIEGAND PROTOCOL

BACKGROUND OF THE INVENTION

This invention relates to access control systems, and in particular to a system and method for utilizing an existing Wiegand infrastructure to support readers and panels with extended data communications functionality.

Access control systems are used for controlling automated access to protected premises, typically through doorways, without requiring in-person security personnel. Typically, a device such as a card reader is positioned near a doorway of a secure area such as a computer room. A person desiring to enter the secure area must present to the reader a card having user data that can be read by the reader. The reader will transmit the user data via a hardwired bus to a control system typically consisting of numerous control panels ultimately connected back to a host computer, which will decide based on certain rules if that person should be allowed to enter the premises at that door. For example, the host computer may be programmed to let certain users in at only certain times of the day, such as normal working hours, or it may be programmed to allow certain users in at all times, or it may be programmed to disallow entry to certain users. If the host computer determines that access should be allowed, it will send a command that will, for example, activate a relay that will open a door strike mechanism, thusly allowing entry by the user that presented the card.

One technology in prevalent use for many years is the wiegand protocol, which utilizes five wires to communicate data and provide power to a dedicated card reader as well known in the art. The five wires are for power, ground, DATA0, DATA1, and LEDCTL. The DATA1 line is a reader output that delivers pulses that are interpreted as binary ones. The DATA0 line is a reader output that delivers pulses that are interpreted as binary zeros. The LEDCTL line is the panel output that determines the state of the LED contained on the reader (off, red, green, or amber). The Wiegand standard protocol well known in the art and is described in detail in "Access Control Standard Protocol for the 26-Bit Wiegand Reader Interface," by the Security Industry Association. The data bits of the transmission from the reader to the panel typically consists of one or more parity bits and numerous data bits, as described in the aforementioned standard. The definition of the data bits are left to the system designer. For example, one data format uses the first 8 bits as a site code (0–255), and the next 16 bits as the card number (0–65,535).

Certain problems exist with the Wiegand protocol, however. For example, the Wiegand protocol is a one-way protocol, since the reader can send data to the panel but the panel cannot send any data to the reader except to control the door mechanism and a status LED. The ability to detect errors is weak because most Wiegand formats only include a leading and trailing parity bit, and wire runs up to 500 feet in an electrically noisy area enhances the possibility of a data transmission error. Further, if the panel detects a data transmission error, there is no way at the present time for it to signal the error detection back to the reader (to obtain a retransmission). The reader has no method of signaling additional information except the ability to control the reader LED. Moreover, there is no way to attach multiple Wiegand readers in a party-line connection scheme and determine which reader generated the data. Finally, there exists no security (such as encryption) between the reader and the panel.

It is therefore an object of the invention to provide a methodology and system for extending the functionality of the Wiegand protocol such that improved readers and panels may be implemented, without requiring rewiring of the existing Wiegand infrastructure in use today.

It is a further object of the invention to provide such a methodology and system for extending the Wiegand protocol while still allowing prior art Wiegand readers to communicate with the panel, such that existing system can be upgraded with certain readers while still allowing existing readers to function in their original manner.

It is a further object of the invention to provide such a methodology and system for extending the Wiegand protocol that will allow improved functionality in the reader such that the user can provide different types of data inputs to the panel.

SUMMARY OF THE INVENTION

Thus, provided is an improvement on the existing Wiegand system, wherein the first major difference is that additional bits are appended to the data stream, which provide supplementary information from the reader (which may or may not be related to a card read) as well as a CRC or other type of error detection and/or correction bits covering all of the data in the transmission. A second major improvement is that the LEDCTL line controlled by the panel is now used to transmit data back to the reader.

As a result of this invention, described herein, no additional wires are required to be connected between the panel and the reader, thus preserving the existing Wiegand infrastructure while providing increased functionality. The panel computer will require no changes to its interface (or other) hardware; only the firmware needs to be modified in accordance with the invention. Messages can be customized by users in accordance with the extended protocol set forth herein.

The Wiegand extension can be turned on or off, so that if a panel does not support the extension, it is not used and the reader behaves as an existing prior art device.

Thus, in accordance with the present invention, provided is an access control security system including a control panel and a plurality of access control groups. Each access control group is interconnected to the control panel on an independent multi-wire Wiegand data bus. Each access control group includes at least one access interface unit that has data output means for transmitting data onto the data bus to the control panel, data input means for receiving data via the data bus from the control panel, and processing means. The processing means interoperates with the data output means and the data input means, and operates data transfers over the data bus. In particular, the processing means is adapted to generate a data message for transmission onto the data bus via the data output means, wherein the data message has a Wiegand message field in accordance with the existing Wiegand protocol, as well as an extended data field. The extended data field can include a status information field indicative of a status condition of the access interface unit. Data transfers are made to the control panel using the electrical and information content of the Wiegand protocol via the Data "0" and Data "1" output signals. Data transfers are made by the control panel using the electrical characteristics of the Wiegand protocol via the LEDCTL input signal as a serial protocol.

The access interface unit further includes user ID reading means for reading an ID device. For example, the ID reading means may be configured to read an access control card, a data transponder, a data-carrying key fob, or biometric data from a user. The processing means interoperates with the ID reading means, and the extended data field includes an information field indicative of a property of an ID read by the ID reading means.

In the system of the present invention, an access control group may include more than one access interface units, in which case the extended data field then includes address information uniquely identifying each access interface unit in an access control group.

The processing means may be adapted to utilize an error detection algorithm such as a CRC as a function of data contained within the extended data field.

The access interface unit may further include user input means (such as pushbutton) for accepting user input functions (such as a door bell), and the status condition of the access interface unit may indicate a function input by a user via the user input means.

The access interface unit may also include external status input means for accepting external status data from an external device coupled thereto, and the status information field of the extended data field then will include the external status data. For example, the external device may be adapted to measure temperature, in which case the external status data is the measured temperature. The external device may also be adapted to detect a change in light incident thereon, or it may be adapted to detect physical tampering with the access interface unit.

The processing means may be further adapted to generate supervision data on a periodic basis, and the status information field could then include the supervision data.

DETAILED DESCRIPTION OF THE PREFERRED EMBODIMENT

Figure 1:
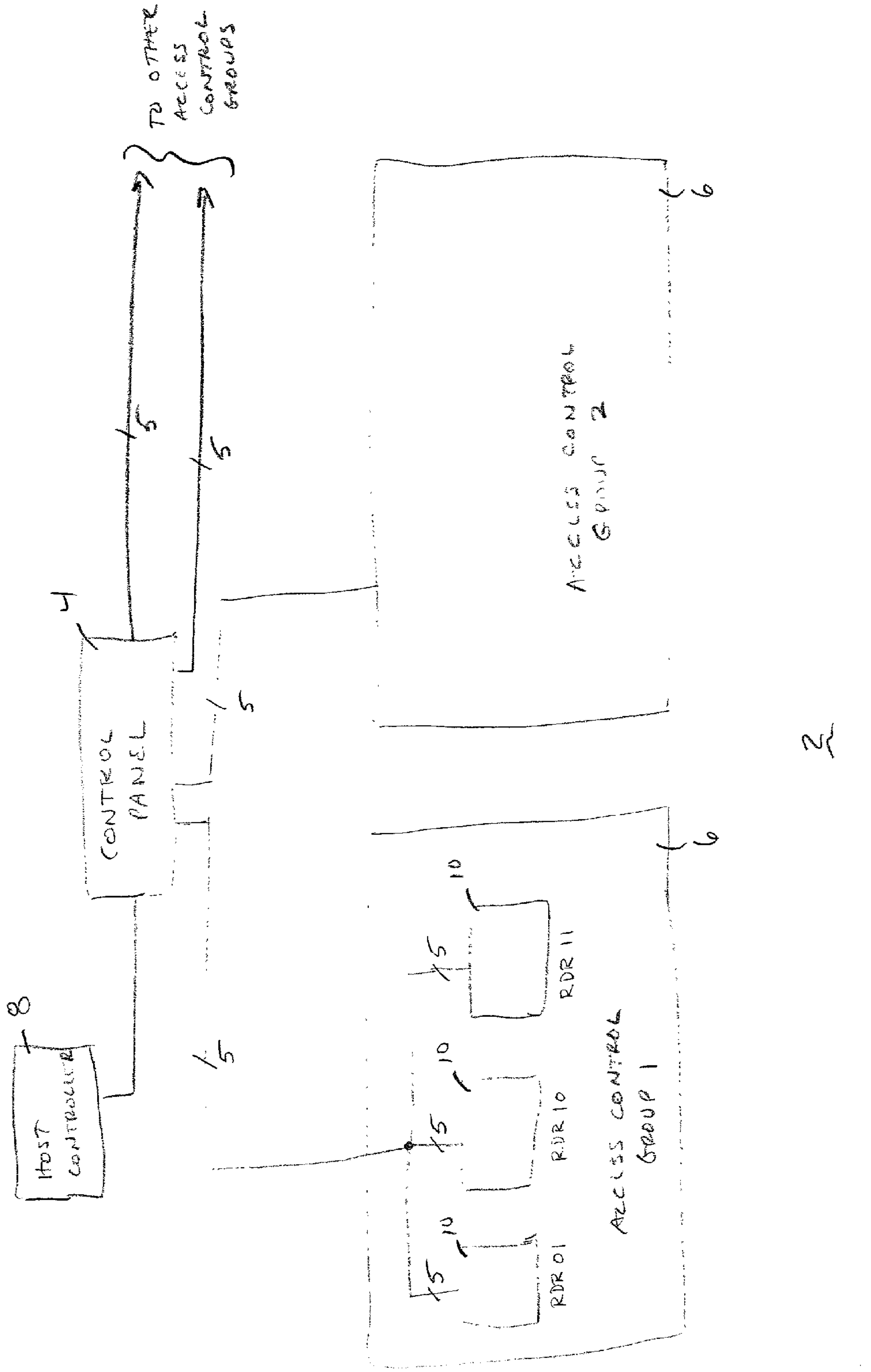
FIG. 1 is a block diagram of the system of the preferred embodiment.

FIG. 1 illustrates a system block diagram of the preferred embodiment of the present invention. The access control system 2 includes a control panel 4 which is used to communicate via several 5-wire buses to various access control groups 6. A host controller 8 provides master data processing and control for one or more control panels 4 as illustrated. Thus, depending on the topology and layout of a building or campus under control, the system 2 can be adapted via various combinations of control panels 4 and access control groups 6.

Each access control group 6 contains up to three access interface units (card readers) 10, as shown in access control group 1 in FIG. 1. Since two address bits are used in the extended protocol described herein, four different addresses are possible. Address 00 is reserved for a broadcast message in the preferred embodiment, so addresses 01, 10 and 11 are useable for discrete readers 10. In the prior art, each 5-wire bus could only communicate with one such card reader 10 since addressing was not possible under the standard Wiegand protocol. Multiple card readers tied to the same 5-wire bus are useful, for example, in situations where it is desired to place one reader on one side of a door and another reader on the other side of the door, thus controlling access in both directions with the same 5-wire interface.

Figure 3:
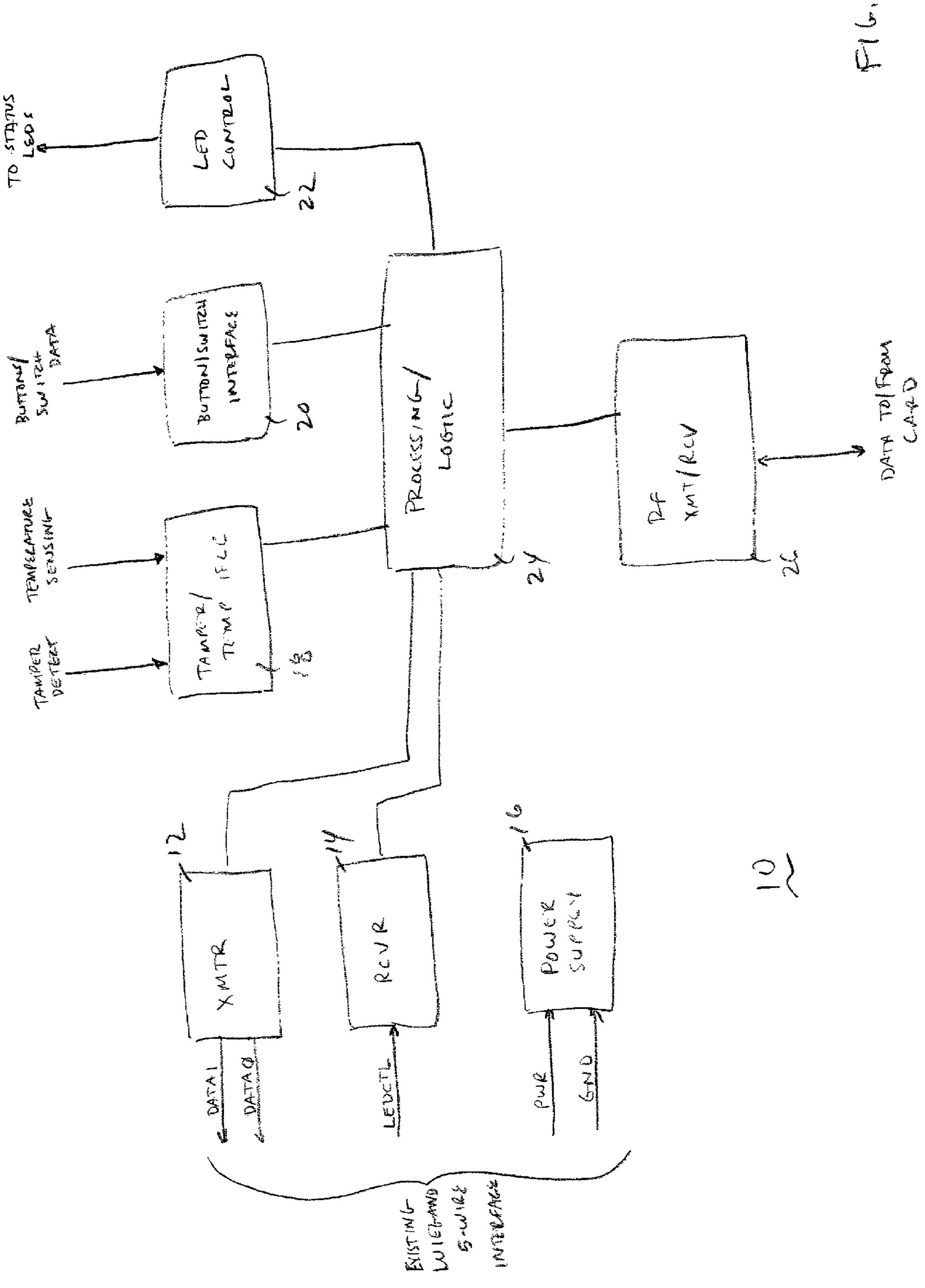
FIG. 3 is a block diagram of the Wiegand reader of the preferred embodiment.

A block diagram of each access interface unit (card reader) 10 is shown in FIG. 3. A Wiegand transmitter 12, Wiegand receiver 14, and power supply circuit 16 are all shown; these operate functionally the same as in prior art Wiegand devices well known in the art. The transmitter 12 and receiver 14 are connected to the DATA1, DATA0, and LEDCTL wires of the standard Wiegand interface as known in the art. Also shown in FIG. 3 is an RF transmitter/receiver 26, which is known in the art and which is used for reading an access control card when presented thereto.

A tamper and temperature sensing interface 18 is shown in FIG. 3, which allows connection of the reader 10 to external tamper and temperature sensing devices. By using a temperature sensor, temperature data may be transmitted back to the control panel 4 with the extended data field. Likewise, by using a tamper sensor, an alarm may be sent to the control panel in the event that someone attempts to alter or destroy the reader 10, and such activity is sensed by the tamper sensor. These types of sensors are well known in the art and need not be described in detail herein.

Also provided is a button/switch interface 20, which is connected to one or more buttons and/or switches that may reside on the housing of the reader 10. These buttons can be programmed to indicate virtually anything that may be desired by the system designer; for example a doorbell function described further below is easily attained by using a doorbell button with the extended protocol. This allows a person without an access card (e.g. a building visitor) to signal that he desires attention at the reader 10 by simply pressing the doorbell button. The doorbell status would be transmitted to the control panel without requiring the use of additional wires as in the prior art.

Also shown in FIG. 3 is LED control block 22, which is used to drive one or more LEDs associated with the reader 10. While the prior art Wiegand systems relied on the LEDCTL wire for this function, the extended protocol allows more data to be communicated to the reader 10, thus providing more sophisticated LED (or other) outputs as desired.

Processor 24 is used to read data from the external sources, formulate data to be transferred over the 5-wire interface, and run all other functions that may be required by the reader 10 of the present invention.

Figure 2:
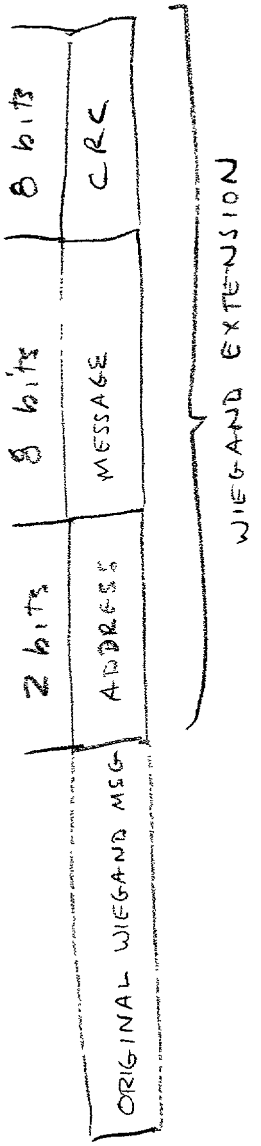
FIG. 2 is an illustration of the extended Wiegand data protocol of the present invention.

In the preferred embodiment, the extended Wiegand protocol adds an additional 18 bits to the prior art (basic) Wiegand data transmission, although of course any amount of extension bits could be added as desired. The first two bits are used for address data to determine which Wiegand reader (also referred to as a Wiegand generator or an access interface unit) generated the data in a party-line configuration in a given access control group, where there is more than one reader available for communications. The next 8 bits contain an information field (message number), and the last eight bits contain a CRC of all preceding bits including the basic Wiegand data. If the panel determines that there is an error in the received Wiegand data (i.e. due to a CRC error), then it can request the reader to retransmit as described herein. The extended protocol is shown in FIG. 2.

The address field (first two bits) is used to distinguish among multiple Wiegand readers sharing the same Wiegand 5-wire bus. In the preferred embodiment, address 00 is reserved for broadcast messages, and addresses 01, 10, and 11 are used to distinguish among multiple readers. An address of 00 is the default when multiple-unit addressing is not used.

Since the electrical characteristics of the Wiegand interface call for open-collector drivers, multiple readers can be attached to the same Wiegand bus. Note that with the robust error checking enabled by the present invention, any attempt by multiple Wiegand generators to talk at the same time (so-called "collisions") will be detected, and then the panel will send out a "rebroadcast message" request using either address 00 or one-by-one to each of the active generators.

In the preferred embodiment, there are seven groups of messages; each is used for different Wiegand generators. For example, these categories include security/access control, time & attendance, parking, etc. Group zero is reserved for messages common to all group, and group 7 is reserved for error messages.

Data Transfer from Panel to Reader

In accordance with the invention, the panel may send data to a reader using an asynchronous serial data stream via the LEDCTL wire at 1200 baud, 8 data bits, 1 stop bit, no parity. All fields in this instance are one byte long. The first byte of a command is divided into two sub-fields. The first two bits are the address field (00-11), and the last six bits contain the command code (000000-111111). The following commands are available in the preferred embodiment:

| COMMAND SENT BY PANEL | | WIEGAND GENERATOR RESPONSE |
|---|---|---|
| 00h <CRC> | 0 = retransmit last Wiegand data transmission <CRC> = 8-bit CRC | Retransmits last Wiegand data message |
| 01h <address> <CRC> | 1 = Return value of selected parameter address <address> = 00 thru FF <CRC> = 8-bit CRC | Parameter value of desired address is transmitted back via the Wiegand extension |
| 02h <address> <data> <CRC> | 2 = set value of selected parameter address <address> = 00 thru FF <data> = 00 thru FF <CRC> = 8-bit CRC | Acknowledgement that data was written is transmitted via the Wiegand extension |
| 03h <LEDCTL> <seconds> <CRC> | 3 = Turn on LED <LEDCTL> = simulation of LED control signals <# of seconds to keep LED on> <CRC> = 8-bit CRC | Acknowledgement is transmitted via the Wiegand extension |

The panel system in the preferred embodiment is able to switch a Wiegand generator from the basic protocol to the extended protocol as follows. Note that this procedure will typically be run when the panel is initialized. The panel will drop the LEDCTL signal low three times within a one-second interval. The Wiegand generator starts an interval timer when the first pulse is received, and then checks to see if it receives two additional pulses within the one-second period from the first pulse. If it receives exactly three pulses as described, then it sends the Wiegand extension message "Capable of Using the Wiegand Extension" in message group 0. The panel then will send out the "Use Wiegand Extension" command to the Wiegand generator, and the Wiegand generator sends the "Command received and executed" message in group 0 and sets a flag in non-volatile memory to use the Wiegand extension (even if power is lost and subsequently restored).

Pushbutton Emulation

In another aspect of the invention, the reader includes one or more push buttons or other types of input devices on the housing that can be used to provide additional information to the panel. Rather than utilize separately added wires for pushbutton functions as in the prior art, this invention utilizes the Wiegand extension protocol to transmit the button data to the panel. Moreover, in this invention, buttons can be required to be pressed before a card will be accepted; button status is reported along with card data in the same Wiegand extension transmission, multiple buttons can be pressed to signify different functions, and buttons may have changeable legends on the housing (since their functionality is easily reprogrammed).

Since the status of the buttons on the housing is reported using the extended Wiegand protocol described herein, no additional wires are required to be added to existing 5 wire Wiegand infrastructure.

A reader can be programmed to report the status of a button without requiring a card to be read. For example, a doorbell function may be emulated in this way, so that a visitor can press the button, causing a doorbell message to be sent to the panel. This can then alert a security person in the area that a visitor who does not have a card needs attention at that entry point. This eliminates the need to provide a separate, dedicated doorbell wiring system as in the prior art.

In addition, the arming and disarming functions of the related security system can now be easily implemented. That is, a user can arm or disarm the security system upon presentation of a valid card authorized for that function.

Similarly, legends such R and C can be used with separate buttons that would be pressed by a user leaving or entering a facility, who would then present the card for identification purposes. This enables the system to keep track of who is in the building at any given time.

A duress or panic condition could be used for example if a person presses a certain combination of buttons upon presentment of the card for entry.

Panel operating parameters can be modified by button presses along with presentment of an authorized card.

CRC

The CRC field contains an 8-bit CRC of all of the preceding Wiegand data and the extended data field. CRC technology is well known in the art and need not be repeated herein.

What is claimed is:

1. An access control security system comprising:

a) a control panel;

b) a plurality of access control groups, each access control group interconnected to the control panel on an independent multi-wire data bus, each access control group comprising:

an access interface unit comprising:

data output means for transmitting data onto the data bus to the control panel, data input means for receiving data via the data bus from the control panel, processing means, interoperating with the data output means and the data input means, for operating data transfers over the data bus, the processing means adapted to generate a data message for transmission onto the data bus via the data output means, the data message comprising a Wiegand message field in accordance with the Wiegand protocol;

wherein at least one of said access interface units is further adapted to implement an extended data field along with the Wiegand message field, and wherein the control panel is adapted to communicate with each access interface unit to determine if the access interface unit is capable of implementing the extended data field, and if the control panel determines that the access interface unit is not capable of implementing the extended data field, then the control panel communicates with that access interface unit in accordance with only the Wiegand protocol, and if the control panel determines that the access interface unit is capable of implementing the extended data field, then the control panel communicates with that access interface unit in accordance with the Wiegand protocol and the extended data field.

2. The system of claim 1 wherein the extended data field comprises a status information field indicative of a status condition of the access interface unit.

3. The system of claim 1 wherein the access interface unit further comprises user ID reading means for reading an ID device.

4. The system of claim 3 wherein the ID reading means is configured to read an access control card.

5. The system of claim 3 wherein the ID reading means is configured to read a data transponder.

6. The system of claim 3 wherein the ID reading means is configured to read a data-carrying key fob.

7. The system of claim 3 wherein the ID reading means is configured to read biometric data from a user.

8. The system of claim 3 wherein the processing means interoperates with the ID reading means, and wherein the extended data field further comprises an information field indicative of a property of an ID read by the ID reading means.

9. The system of claim 1 wherein at least one access control group comprises a plurality of access interface units, and wherein the extended data field comprises address information uniquely identifying each access interface unit in an access control group.

10. The system of claim 1 wherein the processing means is further adapted to utilize an error detection algorithm as a function of data contained within the extended data field.

11. The system of claim 10 wherein the error detection algorithm is a cyclic redundancy check (CRC), and wherein the extended data field is appended with the CRC.

12. The system of claim 2 wherein the access interface unit further comprises user input means for accepting user input functions, and wherein the status condition of the access interface unit indicates a function input by a user via the user input means.

13. The system of claim 12 wherein the input means comprises at least one pushbutton.

14. The system of claim 13 wherein the function of the pushbutton is a door bell function.

15. The system of claim 2 wherein the access interface unit comprises external status input means for accepting external status data from an external device coupled thereto, and wherein the status information field of the extended data field comprises the external status data.

16. The system of claim 15 wherein the external device is adapted to measure temperature, and wherein the external status data comprises the measured temperature.

17. The system of claim 15 wherein the external device is adapted to detect a change in light incident thereon, and wherein the external status data comprises data indicative of a change in light.

18. The system of claim 15 wherein the external device is adapted to detect physical tampering with the access interface unit, and wherein the external status data comprises an tamper indication.

19. The system of claim 2 wherein the processing means is further adapted to generate supervision data on a periodic basis, and wherein the status information field comprises the supervision data.

20. The system of claim 2 wherein the processing means is further adapted to detect a malfunction of the access interface unit, and wherein the status information field comprises data indicative of a malfunction.

21. The system of claim 1 wherein data transfers are made to the control panel using the electrical and information content of the Wiegand protocol via the Data "0" and Data "1" output signals.

22. The system of claim 1 wherein data transfers are made by the control panel using the electrical characteristics of the Wiegand protocol via the LEDCTL input signal as a serial protocol.

* * * * *